Sept. 12, 1933.  H. P. PHILLIPS  1,926,403
ANTIFRICTION BEARING
Filed May 13, 1932  2 Sheets-Sheet 1
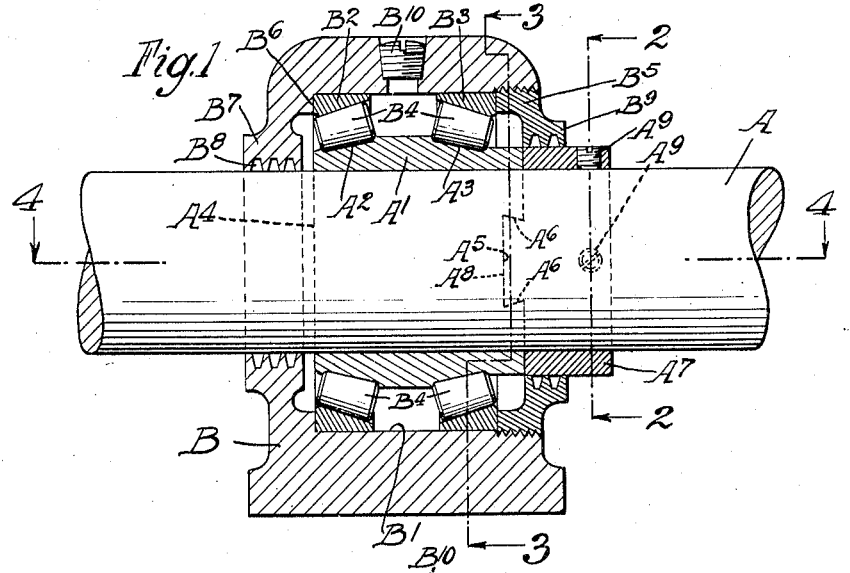
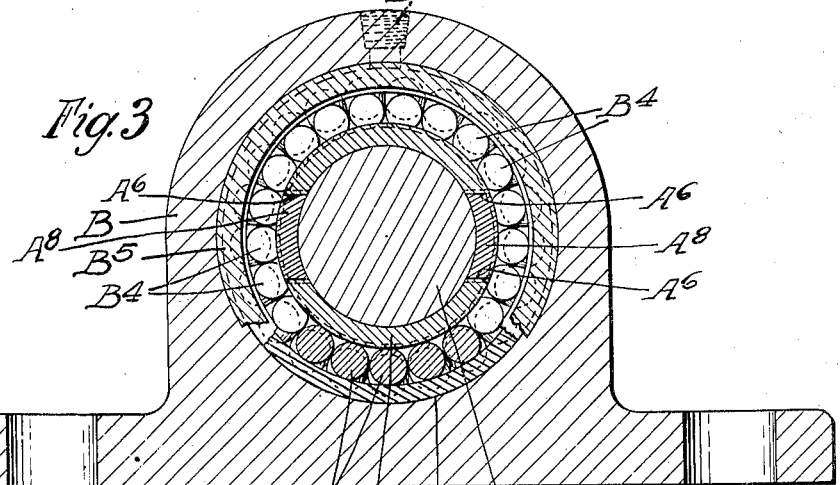
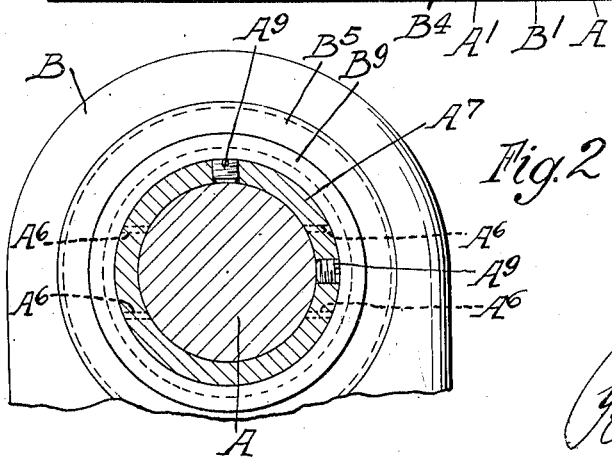
Inventor
Horace P. Phillips
Attorneys.

Sept. 12, 1933.   H. P. PHILLIPS   1,926,403
ANTIFRICTION BEARING
Filed May 13, 1932   2 Sheets-Sheet 2
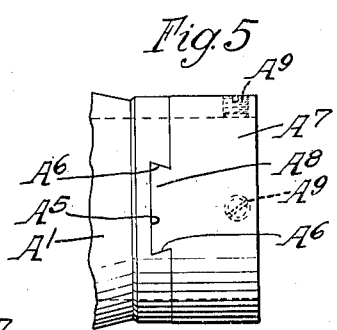
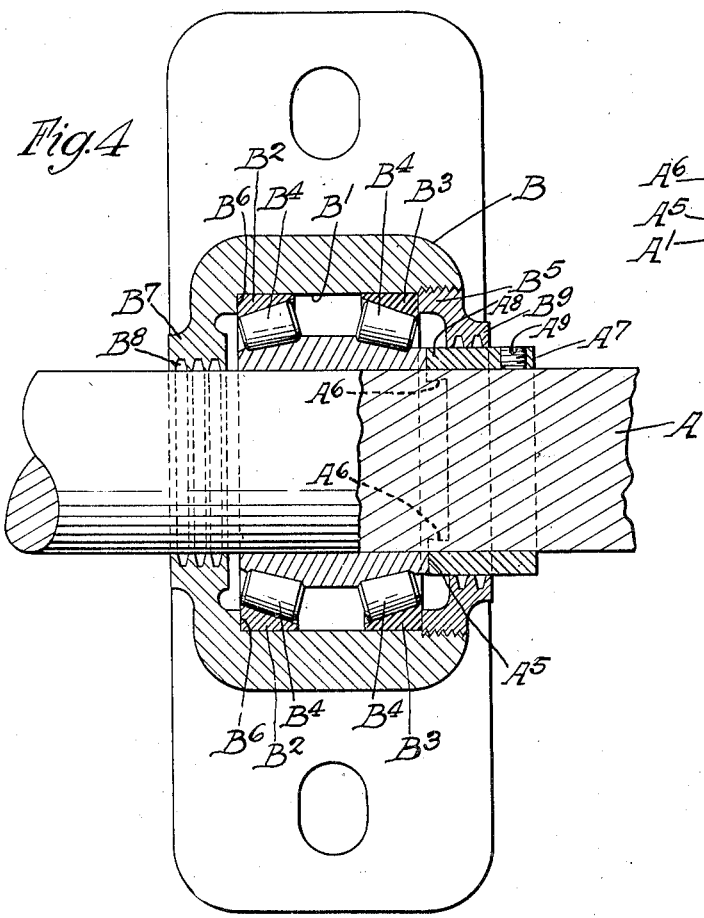
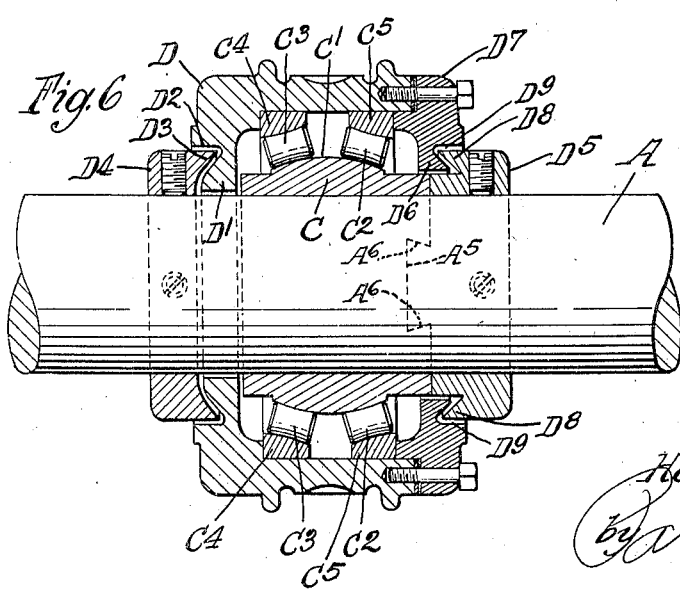
Inventor
Horace P. Phillips
by
Attorneys Patented Sept. 12, 1933

1,926,403

UNITED STATES PATENT OFFICE 1,926,403

ANTIFRICTION BEARING

Horace P. Phillips, San Mateo, Calif., assignor to Link-Belt Company, Chicago, Ill., a corporation of Illinois Application May 13, 1932. Serial No. 611,025

1 Claim. (Cl. 308—236)

My invention relates to improvements in anti-friction bearings and has for one object to provide a new and improved form of anti-friction bearing wherein the inner race is directly mounted on the shaft which it supports and means are provided rigidly attached to the shaft and associated with the race for holding the race against longitudinal displacement on the shaft and against rotary movement thereabout. Another object is to provide a cheap, convenient and simple anti-friction bearing mount and bearing block. Other objects will appear from time to time throughout the specification and claims.

My invention is illustrated more or less diagrammatically in the accompanying drawings, wherein—

Figure 1 is a longitudinal section through the bearing housing and bearing with shaft in elevation;

Figure 2 is a section along the line 2—2 of Figure 1;

Figure 3 is a section along the line 3—3 of Figure 1;

Figure 4 is a section along the line 4—4 of Figure 1;

Figure 5 is a detail side elevation of the holding ring and part of the inner race;

Figure 6 is a view similar to Figure 1 illustrating a modified form of bearing.

Like parts are indicated by like characters throughout the specification and drawings.

A is a shaft preferably the usual type of cold roll shafting or the like. It is generally cylindrical and reasonably accurate as to diameter and roundness. Mounted on it is the inner race $A^1$ of a roller bearing, the race having two opposed inclined or tapered tracks $A^2$ $A^3$. One end of the race is plain as indicated at $A^4$, the other end of the race has two diametrically opposed dove-tail notches $A^5$ $A^5$ milled or otherwise formed therein. The opposed walls of these notches are all parallel at the end of the race and are inwardly tapered as indicated at $A^6$. $A^7$ is a holding ring encircling the shaft. This holding ring has two diametrically opposed tapered keys $A^8$, one adapted to penetrate each of the notches $A^5$ to hold the race and ring in permanent relation with one another. The race and ring can be assembled only before they are placed on the shaft because owing to the tapered dove-tail interlock, they must be brought together by movement in a plane perpendicular to the axis of the cylinder. The ring $A^7$ is anchored on the shaft by one or more set screws $A^9$, preferably in this case two screws being used and spaced by an angle of approximately 90° so that the ring is mounted rigidly on the shaft, being held against rotation thereabout and against longitudinal displacement with respect thereto. The race is a loose working fit on the shaft, there being a few thousandths clearance and the dovetail interlock restricts longitudinal displacement of the race with respect to the ring and constrains the race to rotation with the ring while leaving it free to float on the shaft and protecting it against any binding effect.

B is a housing enclosing the shaft and the race $A^1$. The housing has a cylindrical bearing portion $B^1$ in which fit the two opposed taper outer roller races $B^2$ $B^3$. Interposed between each of the two races $B^2$ $B^3$ and the tracks $A^2$ $A^3$ are a plurality of taper roller bearings $B^4$. These roller bearings and races are held in proper working relation by means of an adjusting ring $B^5$ threaded in the housing and adapted to be rotatable to exert a longitudinal pressure on the race $B^3$, through it to exert a pressure on the rollers $B^4$ and the race $A^1$, which race in turn exerts pressure on the rollers $B^4$ and the race $B^2$ whereby the race $B^2$ is forced against the seat $B^6$ and the race $B^3$ is forced inwardly to maintain the desired pressure by means of the ring $B^5$. The end of the housing adjacent the seat $B^6$ is inwardly flanged and terminates in an expanding grease seal ring $B^7$ having one or more concentric inner peripheral grooves $B^8$, and the member $B^7$ being of such inner peripheral diameter as to just clear the shaft A. A similar arrangement is associated with the lock nut $B^5$, it being inwardly flanged as indicated at $B^9$ but the inner diameter thereof is such as to just clear not the shaft A but the anchor ring $A^7$. $B^{10}$ is a filling plug which may be removed to fill the housing with grease or other lubricant.

In a modified form shown in Figure 6, instead of a taper bearing we have what is in effect a segmental ball and socket bearing. The race C has a truncated spherical bearing $C^1$. Traveling about its periphery are two opposed groups of rollers $C^2$ $C^3$ engaging separate roller races $C^4$ $C^5$. These roller races are annular but in cross section show curved faces and curved about substantially the same radius as the ball C. The working faces of the rollers conform. In effect this is a taper roller bearing. In effect also it is a segmental ball and socket bearing and it permits a certain amount of angular displacement of the shaft without interfering with the bearing action. The race is held on the shaft in exactly the same manner as in the preferred form.

The housing D has a flange $D^1$ extending inwardly toward the shaft. The inner periphery of this flange is smooth and cylindrical and there is considerable clearance between it and the shaft. This flange has provided in its outer wall a V-shaped slot $D^2$ in which penetrates the tapered lip $D^3$ on a packing ring $D^4$ anchored to the shaft. The anchor ring $D^5$ also interlocks with a similar flange $D^6$ on the adjusting ring $D^7$, the anchor ring having the fin $D^8$ penetrating the slot or groove $D^9$ on the anchor ring. The result of this is that a certain amount of angular displacement of shaft with respect to the housing can take place without interfering with the tortuous or labyrinth passage formed between the grease ring on one side and the housing on the other.

The dove-tail blocks and slots I have shown are an entirely satisfactory way of holding the parts together but any suitable interlocking means, T-slots or circular slots or anything of that kind can obviously as is common in the art be used and the notches and keys might be interchanged between the race and the anchor ring if desired.

It will be understood also that this arrangement makes it possible to ship the bearing assembled and ready for use by thrusting the shaft through it because the adjusting collar $B^9$ holds the anchor ring in place and no additional means are required for holding the parts together during shipment. Also it will be noted that while I have shown preferably a labyrinth grease seal, any other grease seal familiar to the art such as raw hide, felt or the like might be used.

I claim:

A bearing for shafts and the like comprising an interiorly cylindrical housing, a shoulder at one end of the cylinder, a plurality of outer anti-friction bearings socketed in the cylindrical housing one of them engaging the shoulder, a single inner race associated with the outer races and anti-friction members between the inner and each of the outer races, a removable closure for the housing adapted to engage the side of one of the outer races in opposition to the race engaging the shoulder whereby the races and anti-friction members are held in proper working relation, a sleeve in dove-tail interlocking relation with the inner race, the threaded closure being apertured to encircle the sleeve, the relative diameter of sleeve and aperture being such that when the closure is in working relation with the housing, it prevents dissociation of the sleeve and race.

HORACE P. PHILLIPS.